(12) United States Patent
Bae et al.

(10) Patent No.: US 7,371,487 B2
(45) Date of Patent: May 13, 2008

(54) METHOD OF FABRICATING BLACK MATRIX OF A COLOR FILTER

(75) Inventors: Ki-deok Bae, Yongin-si (KR); In-Sung Song, Yongin-si (KR); Chang-seung Lee, Yongin-si (KR); Jun-seong Kim, Hwaseong-si (KR); Sung-woong Kim, Suwon-si (KR); Wou-sik Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 84 days.

(21) Appl. No.: 11/505,018

(22) Filed: Aug. 16, 2006

(65) Prior Publication Data

US 2007/0122721 A1 May 31, 2007

(30) Foreign Application Priority Data

Nov. 25, 2005 (KR) .................. 10-2005-0113496
Dec. 14, 2005 (KR) .................. 10-2005-0123162

(51) Int. Cl.
*G02B 5/20* (2006.01)

(52) U.S. Cl. .................. 430/7; 430/328; 430/330; 427/164; 427/535; 427/539; 427/553

(58) Field of Classification Search .............. None
See application file for complete search history.

(56) References Cited

U.S. PATENT DOCUMENTS 5,888,679 A * 3/1999 Suzuki et al. ............... 430/7
6,042,974 A * 3/2000 Iwata et al. ................. 430/7
6,228,435 B1 * 5/2001 Yoshikawa et al. ......... 427/489
6,399,257 B1 * 6/2002 Shirota et al. .............. 430/7
2002/0014470 A1 * 2/2002 Okada et al. ............... 216/24

FOREIGN PATENT DOCUMENTS

| JP | 2000-162424 | | 6/2000 |
| JP | 2000-162426 | | 6/2000 |
| JP | 2003-035812 A | * | 2/2007 |

OTHER PUBLICATIONS

Computer-generated translation of JP 2000-162426, with abstract (Jun. 2000).*

* cited by examiner

*Primary Examiner*—John A. McPherson
(74) *Attorney, Agent, or Firm*—Cantor Colburn, LLP

(57) ABSTRACT

A method of fabricating a black matrix of a color filter is provided. In the method, a black matrix layer formed of a hydrophobic organic material is formed on an upper surface of a transparent substrate. A black matrix is formed by patterning the black matrix layer. Side surfaces of the black matrix are made hydrophilic by irradiating a lower surface of the transparent substrate with ultraviolet rays while heating the black matrix. A black matrix provided by the method is also disclosed.

20 Claims, 8 Drawing Sheets

O₂ PLASMA

METHOD OF FABRICATING BLACK MATRIX OF A COLOR FILTER

CROSS-REFERENCE TO RELATED PATENT APPLICATION

This application claims priority to Korean Patent Application Nos. 10-2005-0113496, filed on Nov. 25, 2005, and 10-2005-0123162, filed on Dec. 14, 2005, and all the benefits accruing therefrom under 35 U.S.C. §119, and the contents of which are incorporated herein by reference in their entirety.

BACKGROUND OF THE INVENTION

1. Field of the Invention

The present invention relates to a method of fabricating a black matrix of a color filter, and more particularly, to a method of fabricating a black matrix of a color filter that can improve brightness uniformity.

2. Description of the Related Art

Conventionally, cathode ray tube ("CRT") monitors have been used for displaying information of televisions ("TVs") or computers. Recently, as a display screen increases in size, flat panel display devices are used for displaying the information. Examples of the flat panel display devices include a liquid crystal display ("LCD"), a plasma display panel ("PDP"), an electroluminescence ("EL") display, a light emitting diode ("LED") display, and a field emission display ("FED"). The LCD is widely used as a computer monitor and as a notebook PC display because of its low power consumption.

The LCD includes a color filter for creating an image of a desired color by transmitting white light modulated by a liquid crystal layer. The color filter includes a plurality of red ("R"), green ("G") and blue ("B") pixels that are arranged in a predetermined pattern on a transparent substrate and are partitioned by a black matrix.

Figure 1A:
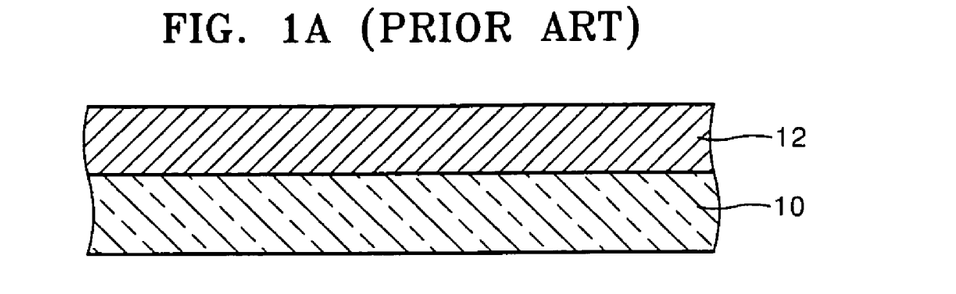
FIGS. 1A and 1B are sectional views illustrating a conventional method of fabricating a black matrix of a color filter.
Figure 1B:
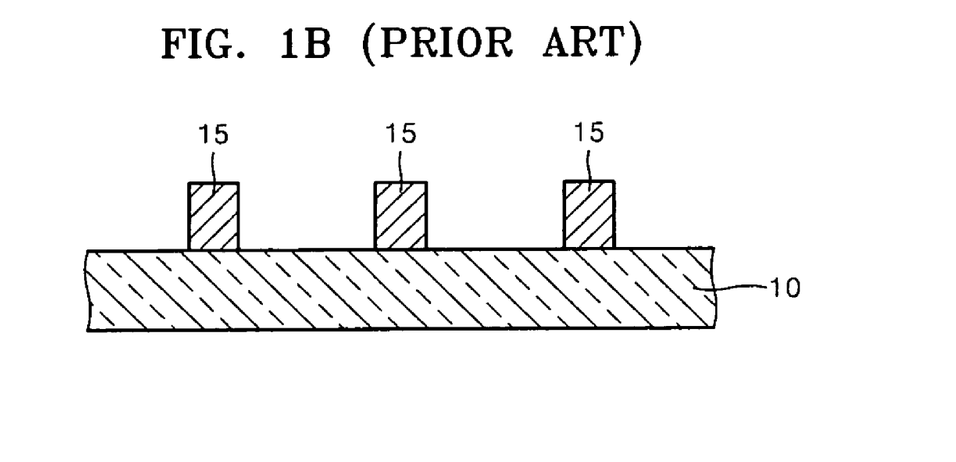
Figure 2:
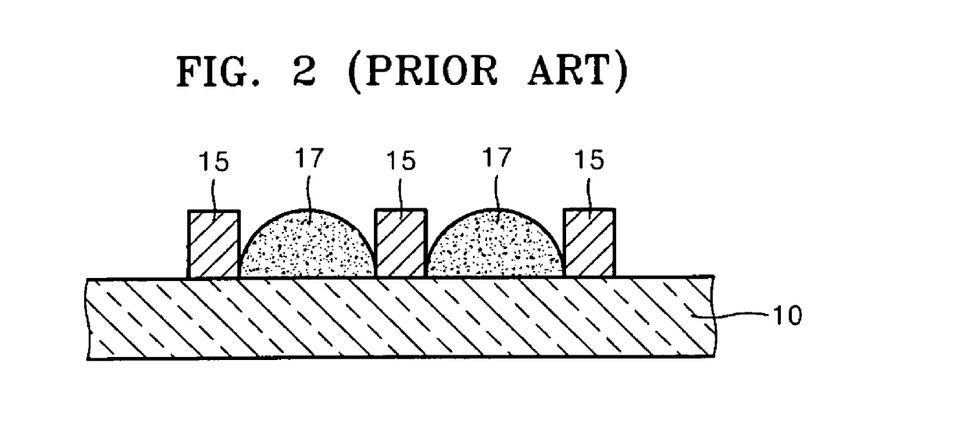
FIG. 2 is a sectional view of a color filter that is manufactured using the black matrix fabricated by the conventional method illustrated in FIGS. 1A and 1B.

FIGS. 1A and 1B are sectional views illustrating a conventional method of fabricating the black matrix of a color filter. Referring to FIG. 1A, an upper surface of a transparent substrate 10 is coated to a predetermined thickness with a black matrix layer 12 formed of a hydrophobic organic material, and the black matrix layer 12 is baked. Referring to FIG. 1B, the black matrix layer 12 is patterned to form patterns 15 of a black matrix. FIG. 2 is a sectional view of a color filter that is manufactured using the black matrix fabricated by the conventional method illustrated in FIGS. 1A and 1B. Referring to FIG. 2, regions among the black matrix patterns 15 are coated with ink 17 of a given color to form pixels, thereby manufacturing the color filter.

However, since the side surfaces (i.e., the side walls) of the black matrix patterns 15 are hydrophobic and have a large contact angle with the ink 17, the substrate 10 is not coated to a uniform thickness with the ink 17, as illustrated in FIG. 2. Accordingly, light leakage occurs near the side surfaces of the black matrix patterns, and thus light emitted from the respective pixels of the color filter has a brightness that is non-uniform across a given pixel.

Figure 3A:
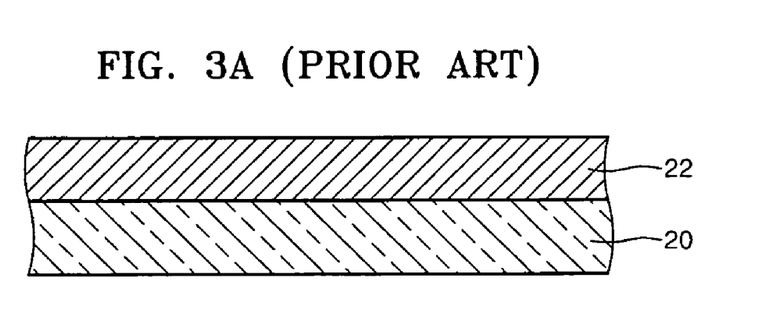
FIGS. 3A through 3C are sectional views illustrating another conventional method of fabricating a black matrix of a color filter.
Figure 3B:
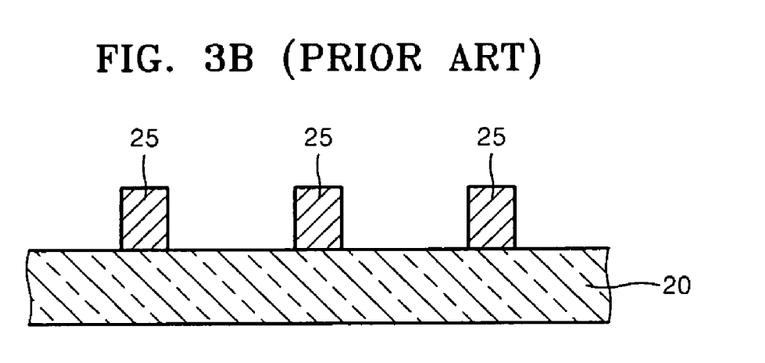
Figure 3C:
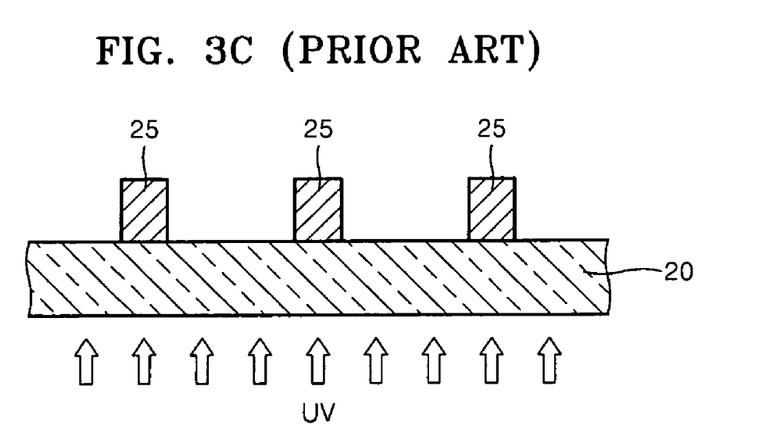

FIGS. 3A through 3C are sectional views illustrating another conventional method of fabricating a black matrix of a color filter, which is disclosed in Japanese Patent Laid-open Publication No. 2000-162426. This method provides side surfaces of black matrix patterns that are hydrophilic, unlike the method illustrated in FIGS. 1A, 1B, and 2. Referring to FIG. 3A, an upper surface of a transparent substrate 20 is coated to a predetermined thickness with a black matrix layer 22 formed of a hydrophobic organic material, and the black matrix layer 22 is baked. Referring to FIG. 3B, the black matrix layer 22 is patterned to form patterns 25 of a black matrix. Referring to FIG. 3C, a lower surface of the transparent substrate 20 is exposed to ultraviolet ("UV") rays such that the UV rays irradiate the side surfaces of the black matrix patterns but do not irradiate the upper surfaces of the black matrix patterns 25. Consequently, while the upper surfaces of the black patterns 25 maintain their hydrophobicity, the side surfaces of the black patterns 25 become hydrophilic by adsorbing moisture from air.

However, the above method does not fundamentally alter the side surfaces of the black matrix patterns 25 to make them hydrophilic.

BRIEF SUMMARY OF THE INVENTION

In an embodiment, the present invention provides a method of fabricating a black matrix of a color filter that can improve brightness uniformity.

According to an aspect of the present invention, there is provided a method of fabricating a black matrix of a color filter, where the method includes: forming a black matrix layer on an upper surface of a transparent substrate, the black matrix layer being formed of a hydrophobic organic material; forming a black matrix by patterning the black matrix layer; and making the side surfaces of the black matrix hydrophilic by irradiating a lower surface of the transparent substrate with ultraviolet rays while heating the black matrix.

The black matrix may be heated at a temperature of 100-500° C.

The method may further include attaching a reflection plate to an upper surface of the black matrix after the forming of the black matrix, the reflection plate reflecting ultraviolet rays having penetrated the transparent substrate. The reflection plate may be heated to heat the black matrix.

The reflection plate is formed of a material with a light reflectivity of greater than or equal to 30% of incident light. Specifically, the reflection plate may be formed of at least one metal selected from the group consisting of gold (Au), silver (Ag), aluminum (Al), platinum (Pt), chrome (Cr), copper (Cu), iron (Fe), nickel (Ni), molybdenum (Mo), and a combination comprising at least one of the foregoing metals. A surface of the reflection plate reflecting the ultraviolet rays may be roughened by processing such that the ultraviolet rays are scattered onto the side surfaces of the black matrix.

The reflection layer may be closely held to the upper surface of the black matrix so that the reflection layer and upper surface of the black matrix are in intimate contact with each other, and so that the upper surface of the black matrix does not contact air. The reflection layer may be closely held to the upper surface of the black matrix by vacuum adhesion.

According to another aspect, there is provided a method of fabricating a black matrix of a color filter, where the method includes: forming a black matrix layer on an upper surface of a transparent substrate, where the black matrix layer is formed of a hydrophobic organic material; forming a black matrix by patterning the black matrix layer; attaching a plurality of blocking layers to an upper surface of the black matrix, the blocking layers being formed of a material that permits the transmitting of ultraviolet rays; and making the side surfaces of the black matrix hydrophilic by irradiating the blocking layers with ultraviolet rays.

The blocking layers may each have a different refractivity such that ultraviolet rays having penetrated the blocking layers irradiated the side surfaces of the black matrix.

According to another aspect, there is provided a method of fabricating a black matrix of a color filter, where the method includes: forming a black matrix layer on an upper surface of a transparent substrate, the black matrix layer being formed of a hydrophobic organic material; forming a black matrix by patterning the black matrix layer; attaching a blocking layer to an upper surface of the black matrix; and making the side surfaces of the black matrix hydrophilic by exposing the side surfaces of the black matrix to a plasma (i.e., a hot, ionized gas).

The method may further include attaching at least one pressure layer to an upper surface of the blocking layer after the attaching of the blocking layer, such that the pressure layer applies pressure onto the blocking layer to closely hold the blocking layer to the upper surface of the black matrix such that the blocking layer and upper surface of the black matrix are in intimate contact with each other.

In another aspect, a black matrix prepared by forming a black matrix layer on an upper surface of a transparent substrate, the black matrix layer being formed of a hydrophobic organic material, forming a black matrix by patterning the black matrix layer, and making the side surfaces of the black matrix hydrophilic by irradiating the side surfaces with ultraviolet rays while heating the black matrix, or by exposing the side surfaces of the black matrix to a plasma, so that the black matrix has a side surface contact angle with an ink of less than or equal to 15°. A display device may be prepared from the black matrix.

BRIEF DESCRIPTION OF THE DRAWINGS

The above and other features and advantages of the present invention are further shown by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals in the drawings denote like elements, and thus their description will be omitted.

It will be understood that when an element is referred to as being "on" another element, it can be directly on the other element or intervening elements may be present therebetween. In contrast, when an element is referred to as being "disposed on" another element, the elements are understood to be in at least partial contact with each other, unless otherwise specified. Spatially relative terms, such as "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees, inverted, or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 4A:
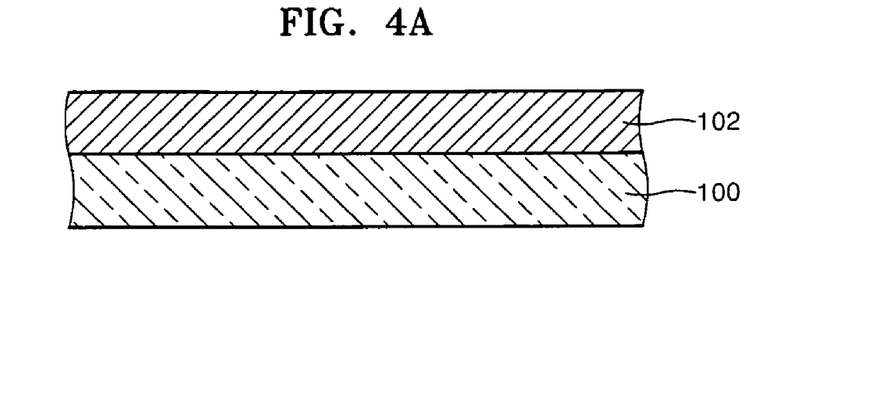
FIGS. 4A through 4C are sectional views illustrating a method of fabricating a black matrix of a color filter according to an embodiment.
Figure 4B:
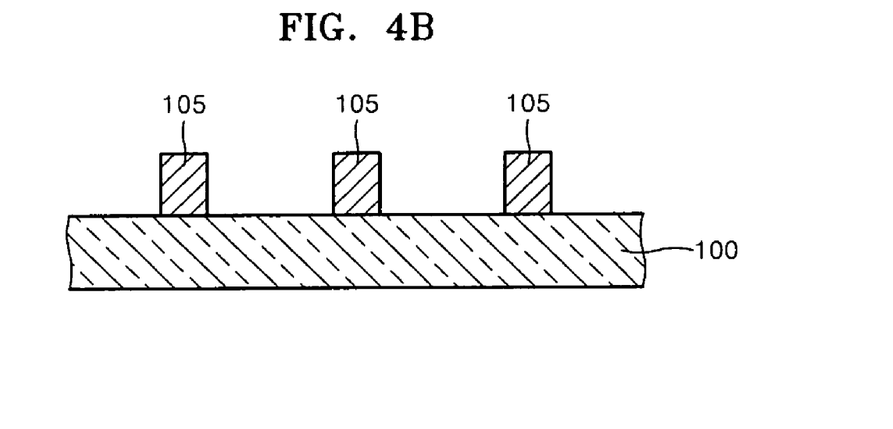
Figure 4C:
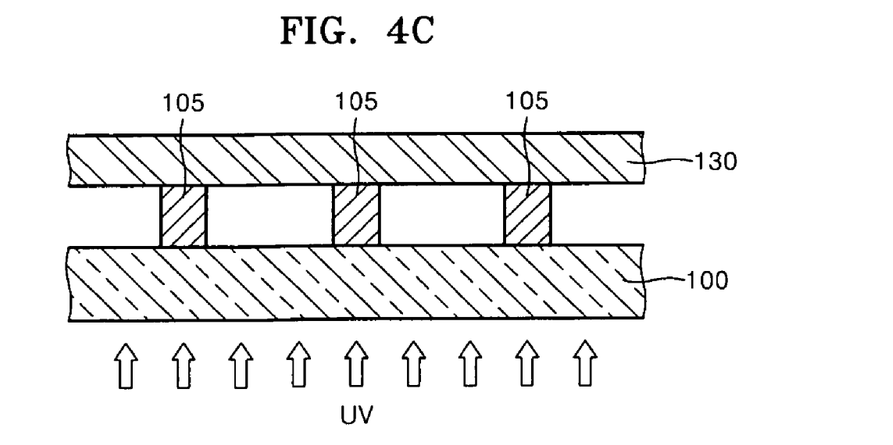

FIGS. 4A through 4C are sectional views illustrating a method of fabricating a black matrix of a color filter according to an embodiment.

Referring to FIG. 4A, an upper surface of a transparent substrate 100 is coated to a predetermined thickness with a hydrophobic organic material and a soft baking (i.e., drying) process is performed on the hydrophobic organic material, thereby forming a black matrix layer 102. The transparent substrate 100 may be formed of glass or plastic. The transparent substrate 100 may be coated with the hydrophobic organic material by spin coating, die coating, or dip coating.

Referring to FIG. 4B, the black matrix layer 102 is patterned to form patterns of a black matrix 105. When the black matrix layer 102 is formed of a photosensitive material, it is exposed and developed using a photomask (not illustrated) having a predetermined pattern formed therein. Otherwise, when the black matrix layer 102 is formed of a non-photosensitive material, an upper surface of the black matrix layer 102 is coated with a photoresist, the photoresist is patterned by photolighography, and the black matrix layer 102 is etched to receive the pattern transferred from the patterned photoresist that is used as an etch mask.

Referring to FIG. 4C, unlike the conventional art where only irradiation using UV rays has been found to change (i.e., decrease) the contact angle of the surface of the black matrix, ultraviolet (UV) rays are used to irradiate a lower surface of the transparent substrate 100 while the black matrix 105 is being heated. In this case, the contact angle of the surface of the black matrix 105, as determined by placing a drop of the desired test medium, e.g. an ink solution, on the surface and measuring the angle of contact between the drop and the surface using a goniometer, can be changed (i.e., decreased) to a desired degree. Irradiation can thereby be used to decrease the contact angle. The black matrix 105 may be heated at a temperature of about 100-500° C.

Consequently, a portion of the surface of the black matrix 105, which have been irradiated by the UV rays, has a different contact angle than the other portions of the surface of the black matrix 105. Specifically, side surfaces of the black matrix 105, which have been irradiated by UV rays having penetrated from the UV-ray exposed transparent substrate 100, become hydrophilic by absorbing moisture from air. On the contrary, an upper surface of the black matrix 105 maintains its hydrophobicity because the UV rays penetrating the transparent substrate 100 do not reach it. In this embodiment, the contact angle of the side surfaces of the black matrix 105 with respect to the ink may be, for example, less than or equal to 15°, and the contact angle of the upper surface of the black matrix 105 with respect to ink may be, for example, greater than or equal to 35°.

Moreover, the side surfaces of the black matrix 105 can be more readily made hydrophilic by inclusion of a reflection plate 130 for reflecting UV rays that is attached to the upper surface of the black matrix 105, as illustrated in FIG. 4. In this case, the reflection plate 130 may be heated to heat the black matrix 105 to a predetermined temperature. The reflection plate 130 reflects the UV rays penetrating the transparent substrate 100 to thereby irradiating the side surfaces of the black matrix 105, while preventing the UV rays from reaching the upper surface of the black matrix 105. The reflection plate 130 may be formed of a material having a light reflectivity of about 30% or more. Specifically, the reflection plate 130 may be formed of at least one metal selected from the group consisting of gold (Au), silver (Ag), aluminum (Al), platinum (Pt), chrome (Cr), copper (Cu), iron (Fe), nickel (Ni), molybdenum (Mo), or a combination comprising at least one of the foregoing metals.

A surface of the reflection plate 130 reflecting the UV rays may be processed to have a predetermined roughness. The surface may be roughened by mechanical, chemical, physical (e.g., thermal or electrical), or other methods including a combination of methods, to provide a roughened surface. This is done to allow the UV rays reflected by the reflection plate 130 after penetrating the transparent substrate 100, to be scattered onto the side surfaces of the black matrix 105.

The reflection plate 130 may be closely held to the upper surface of the black matrix 105, so that the upper surface of the black matrix 105 does not contact air. As used herein, "closely held" means that the specified elements (e.g., the reflection plate and upper surface of the black matrix) are in intimate contact with each other, and are maintained in intimate contact with each other. The reflection plate 130 may be closely held to the upper surface of the black matrix 105 by various methods such as, for example, vacuum adhesion.

As above, by irradiating the lower surface of the transparent substrate 100 with UV rays while heating the black matrix 105, the side surfaces of the black matrix 105, which have been exposed to UV rays penetrating from the transparent substrate 100 after irradiation, are thereby made hydrophilic.

Figure 5A:
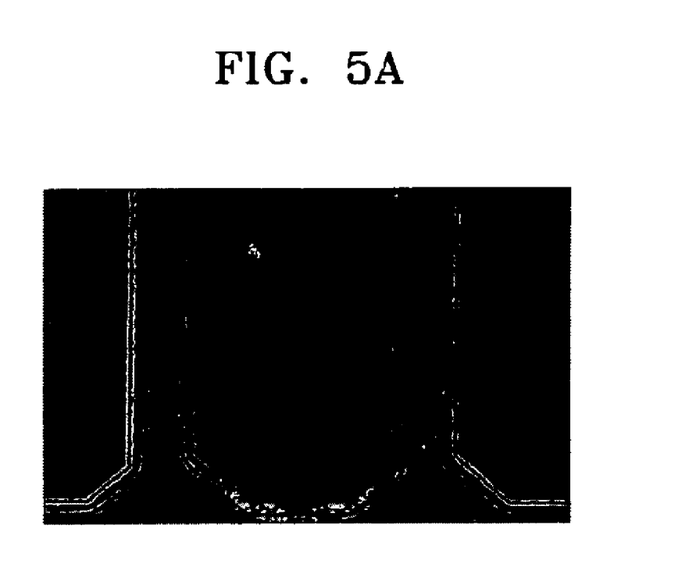
FIG. 5A is a photograph of a color filter that is manufactured by filling a space between black matrix patterns having hydrophobic side surfaces with an ink.
Figure 5B:
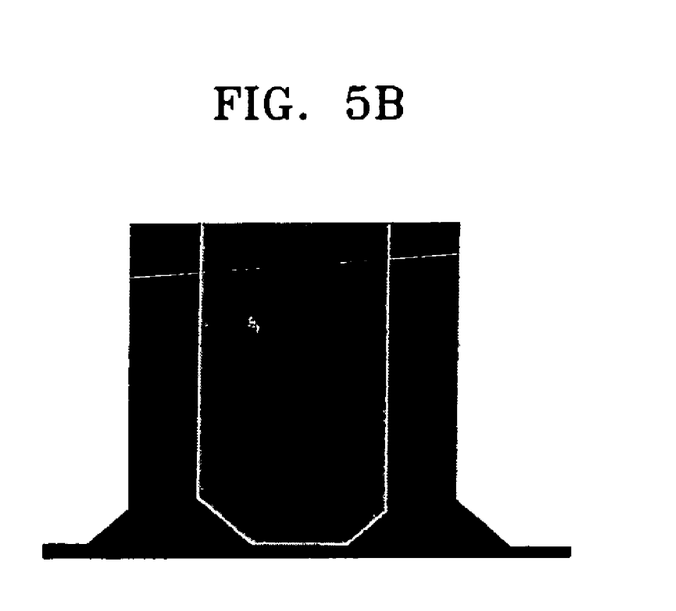
FIG. 5B is a photograph of the color filter of FIG. 5A that is taken while the color filter is being penetrated by light.

FIG. 5A is a photograph of a color filter that is manufactured by filling a space between black matrix patterns having hydrophobic side surfaces with ink. FIG. 5B is a photograph of the color filter of FIG. 5A that is taken while the color filter is being penetrated by light. As can be seen from FIG. 5A, since the side surfaces of the black matrix are hydrophobic, the ink does not fill a space near the side surfaces of the black matrix to the desired degree. Consequently, as can be seen from FIG. 5B, light leakage occurs near the side surfaces of the black matrix.

Figure 6A:
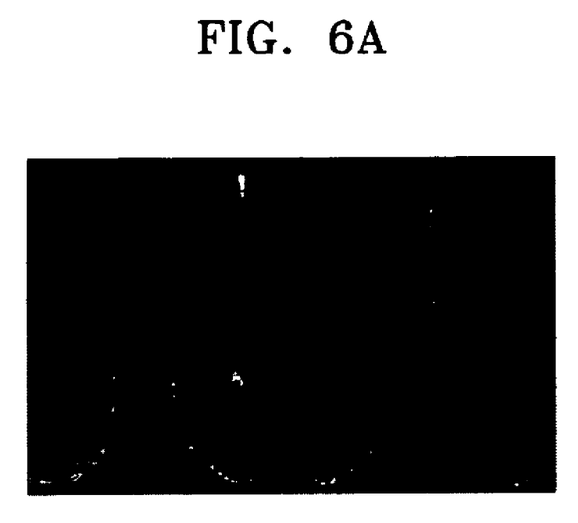
FIG. 6A is a photograph of a color filter that is manufactured by filling with ink a space between the black matrix patterns (105 of FIG. 4C) having hydrophilic side surfaces.
Figure 6B:
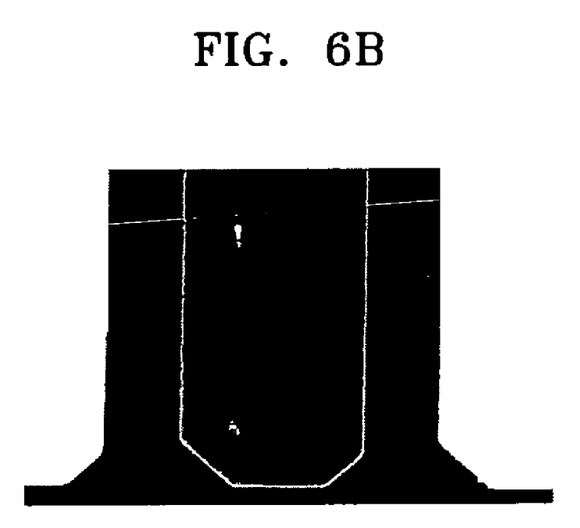
FIG. 6B is a photograph of the color filter of FIG. 6A that is taken while the color filter is being penetrated by light.

FIG. 6A is a photograph of a color filter that is manufactured by filling with ink a space between the black matrix patterns (105 of FIG. 4C) having hydrophilic side surfaces. FIG. 6B is a photograph of the color filter of FIG. 6A that is taken while the color filter is being penetrated by light. As can be seen from FIG. 6A, since most of the side surfaces of the black matrix are hydrophilic, the space near the side surfaces of the black matrix 105 is filled with the ink to a desired degree. Consequently, as can be seen from FIG. 6B, little light leakage occurs near the side surfaces of the black matrix having hydrophilic side surfaces.

Figure 7A:
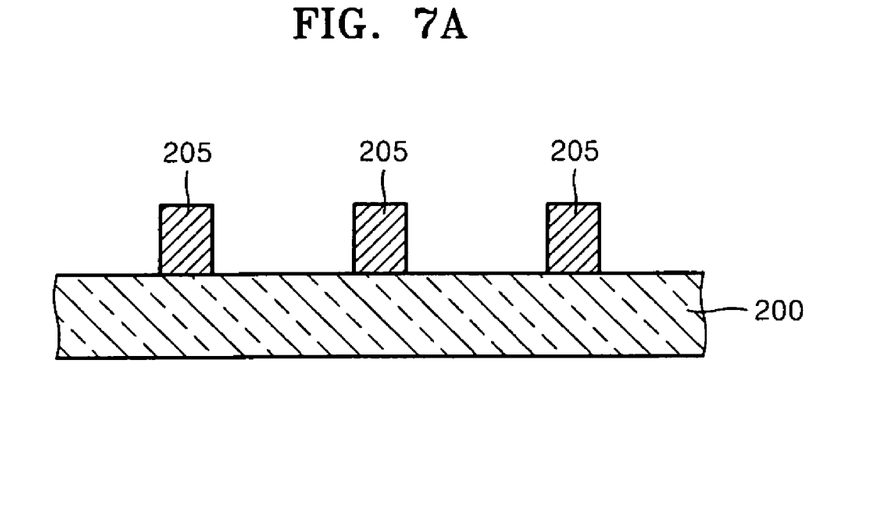
FIGS. 7A and 7B are sectional views illustrating a method of fabricating a black matrix of a color filter according to another embodiment.
Figure 7B:
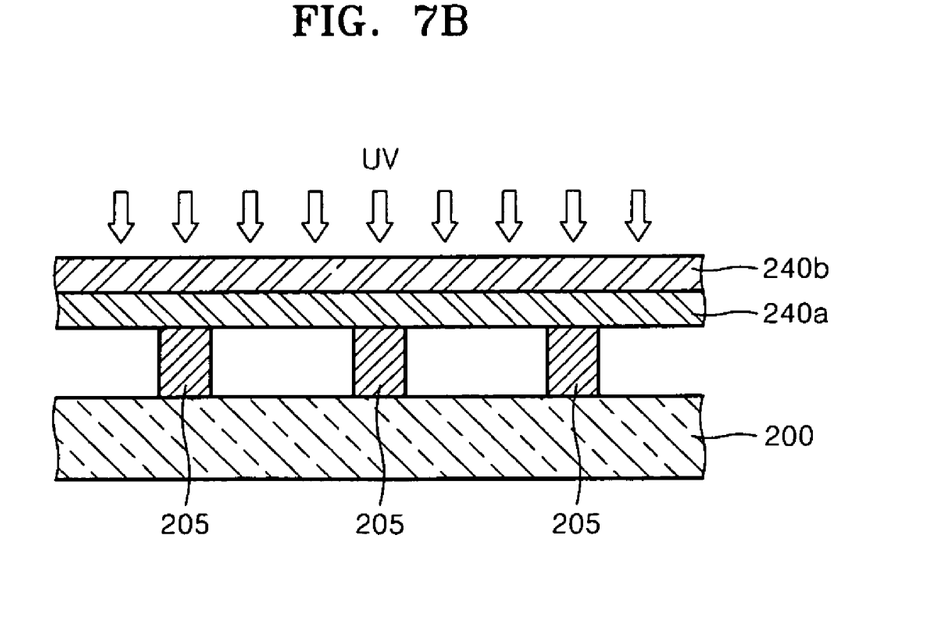

FIGS. 7A and 7B are sectional views illustrating a method of fabricating a black matrix of a color filter according to another embodiment of the present invention.

Referring to FIG. 7A, patterns of a black matrix 205 are formed on an upper surface of a transparent substrate 200. As described above, the black matrix patterns 205 may be formed by coating the upper surface of the transparent substrate 200 with a black matrix layer (not shown) formed of a hydrophobic organic material and then patterning the black matrix layer.

Referring to FIG. 7B, first and second blocking layers 240a and 240b formed of a material transmitting UV rays are attached to an upper surface of the black matrix 205. Thereafter, when UV rays are used to irradiate an upper surface of the second blocking layer 240b, they penetrate the first and second blocking layers 240a and 240b. These penetrating UV rays reach the side surfaces of the black matrix 205, and thus the side surfaces of the black matrix 205 are made hydrophilic by adsorbing moisture from the surrounding air. As described above, the black matrix 205 may be heated at a predetermined temperature during the irradiation with the UV rays.

The first blocking layer 240a is closely held to the upper surface of the black matrix 205, such that the first blocking layer and upper surface of the black matrix are in intimate contact with each other, so that the upper surface of the black matrix 205 is not in contact with air. Accordingly, since the upper surface of the black matrix 205 does not contact air, the black matrix thereby maintains its hydrophobicity. The first and second blocking layers 240a and 240b may have different optical refractivities. Accordingly, the irradiating UV rays are refracted while penetrating the first and second blocking layers 240a and 240b. The refracted UV rays irradiate the side surfaces of the black matrix 205, making the side surfaces of the black matrix 205 hydrophilic. In an embodiment, two blocking layers are attached and are closely held to the upper surface of the black matrix. In another embodiment, three or more blocking layers may be attached to the upper surface of the black matrix.

Figure 8A:
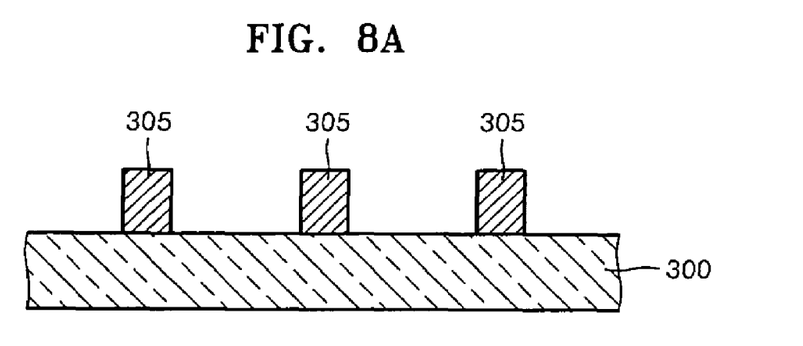
FIGS. 8A through 8C are sectional views illustrating a method of fabricating a black matrix of a color filter according to another embodiment.
Figure 8B:
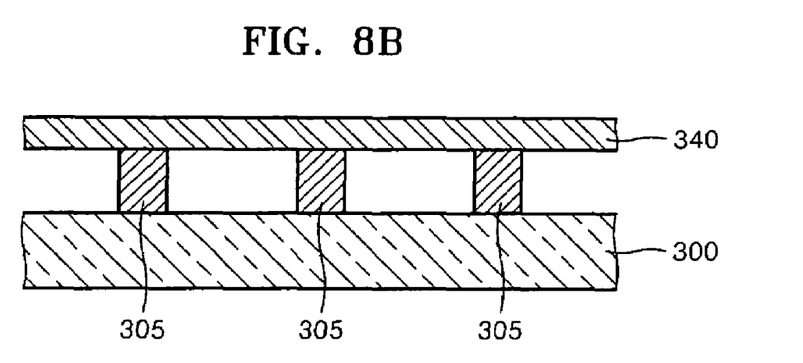
Figure 8C:
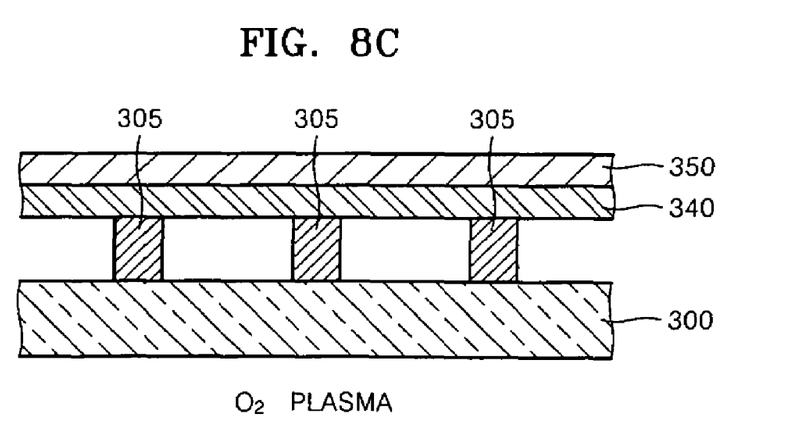

FIGS. 8A through 8C are sectional views illustrating a method of fabricating a black matrix of a color filter according to another embodiment of the present invention.

Referring to FIG. 8A, patterns of a black matrix 305 are formed on an upper surface of a transparent substrate 300. As described above, the black matrix patterns 305 may be formed by coating the upper surface of the transparent substrate 300 with a black matrix layer (not shown) formed of a hydrophobic organic material, and then patterning the black matrix layer.

Figure 9:
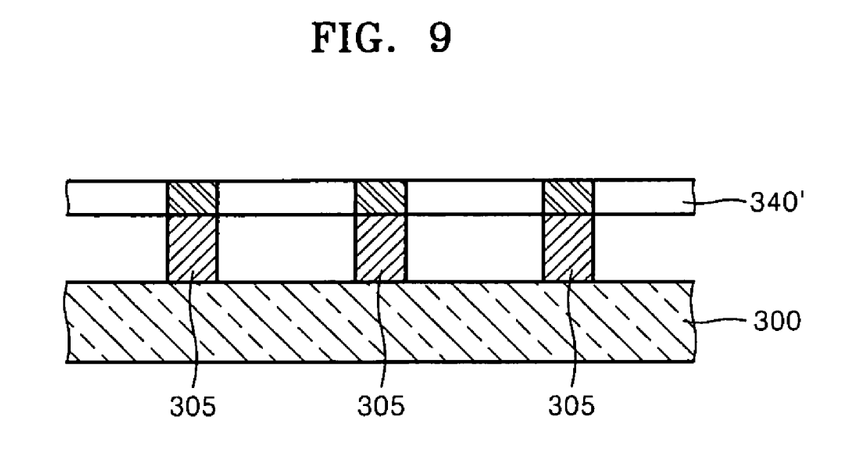
FIG. 9 is a sectional view illustrating a modified blocking layer applicable to an embodiment.
Figure 10:
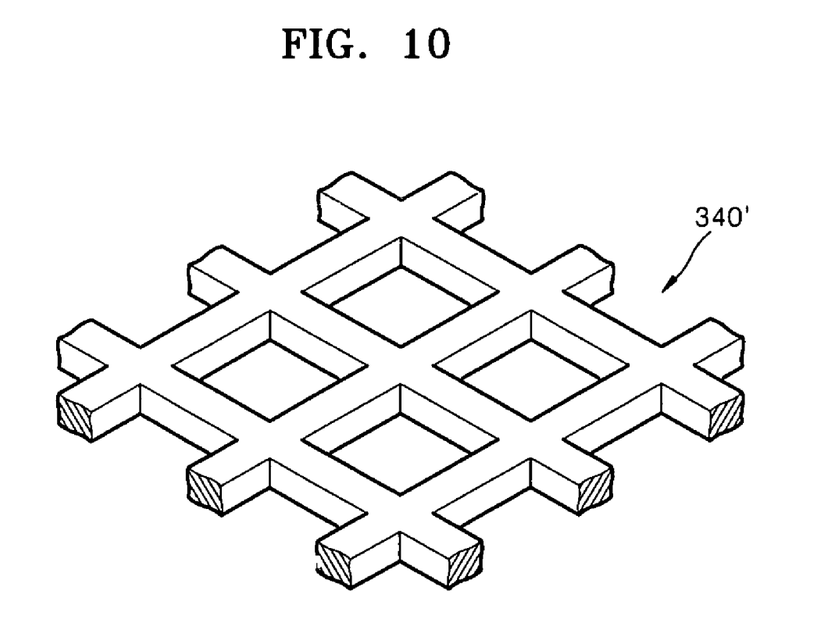
FIG. 10 is a perspective view of the modified blocking layer illustrated in FIG. 9.

Referring to FIG. 8B, a blocking layer 340 is attached to an upper surface of the black matrix 305. The blocking layer 340 is attached and closely held to the upper surface of the black matrix 305 to prevent the upper surface of the black matrix 305 from being exposed to a plasma that will be described later. Accordingly, the upper surface of the black matrix 305 maintains hydrophobicity. The blocking layer 340 may be formed in various shapes such as a plate shape illustrated in FIG. 8 B. FIGS. 9 and 10 are, respectively, sectional and perspective views of a modified blocking layer 340' useful in the embodiment of the present invention. Referring to FIGS. 9 and 10, the blocking layer 340' has a shape corresponding to the black matrix 305 and is attached to the upper surface of the black matrix 305.

Referring to FIG. 8C, a pressure layer 350 may be further disposed on an upper surface of the blocking layer 340. The pressure layer 350 applies pressure on the blocking layer 340 toward the black matrix 305, and thus the blocking layer 340 is more closely held to the upper surface of the black matrix 305. Accordingly, the upper surface of the black matrix 305 can be more effectively prevented from becoming hydrophilic due to the plasma. In order to uniformly maintain the pressure applied on the blocking layer 340, the inside of the pressure layer 350 may be filled with fluid such as gas and liquid. In an embodiment, one pressure layer 350 is disposed on the upper surface of the blocking layer 340. In another embodiment (not shown), two or more pressure layers may be disposed on the upper surface of the blocking layer 340.

Thereafter, the black matrix 305 is exposed to a plasma, and its side surfaces which are exposed to the plasma react with the plasma to become hydrophilic. At this time, since the blocking layer 340 and the pressure layer 350 prevent the upper surface of the black matrix 305 from being exposed to the plasma, the upper surface of the black matrix 305 does not become hydrophilic but maintains its hydrophobicity. In an exemplary embodiment, the plasma for hydrophilizing the side surfaces of the black matrix 305 may be oxygen ($O_2$) plasma.

A black matrix can, therefore, be made by forming the patterned black matrix and making the side surfaces of the black matrix hydrophilic by irradiating the side surfaces with UV rays while heating, or by exposing the side surfaces of the black matrix to a plasma, The black matrix fabrication methods described above and black matrixes prepared thereby are applicable not only to an LCD but also to other display devices such as an organic EL device. For example, the black matrix fabrication methods can be used to fabricate a bank of pixels in the organic EL device.

As described hereinabove, the black matrix fabrication methods according to the present invention make it possible to make only the side surfaces of the black matrix hydrophilic while maintaining the hydrophobicity of the upper surface. Accordingly, the spaces partitioned by the black matrix can be filled to a uniform thickness with an ink of a given color. Consequently, the light leakage can be prevented from occurring near the side surfaces of the black matrix, thereby improving the brightness uniformity of the display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a black matrix of a color filter, the method comprising:
    forming a black matrix layer on an upper surface of a transparent substrate, the black matrix layer being formed of a hydrophobic organic material;
    forming a black matrix by patterning the black matrix layer; and
    making the side surfaces of the black matrix hydrophilic by irradiating a lower surface of the transparent substrate with ultraviolet rays while heating the black matrix.

2. The method of claim 1, wherein the black matrix is heated at a temperature of 100-500° C.

3. The method of claim 1, further comprising attaching a reflection plate to an upper surface of the black matrix after the forming of the black matrix, wherein the reflection plate reflects ultraviolet rays that have penetrated the transparent substrate.

4. The method of claim 3, wherein the reflection plate is heated to heat the black matrix.

5. The method of claim 3, wherein the reflection plate is formed of a material with a light reflectivity of greater than or equal to 30% of incident light.

6. The method of claim 5, wherein the reflection plate is formed of at least one metal selected from the group consisting of gold (Au), silver (Ag), aluminum (Al), platinum (Pt), chrome (Cr), copper (Cu), iron (Fe), nickel (Ni), molybdenum (Mo), and a combination comprising at least one of the foregoing.

7. The method of claim 3, wherein a surface of the reflection plate reflecting the ultraviolet rays is roughened processing such that the ultraviolet rays are scattered onto the side surfaces of the black matrix.

8. The method of claim 3, wherein the reflection layer is attached and closely held to the upper surface of the black matrix such that the upper surface of the black matrix does not contact air.

9. The method of claim 8, wherein the reflection layer is closely held to the upper surface of the black matrix by vacuum adhesion.

10. A method of fabricating a black matrix of a color filter, the method comprising:
    forming a black matrix layer on an upper surface of a transparent substrate, the black matrix layer being formed of a hydrophobic organic material;
    forming a black matrix by patterning the black matrix layer;

attaching a plurality of blocking layers successively to an upper surface of the black matrix, the blocking layers being formed of a material capable of transmitting ultraviolet rays; and making the side surfaces of the black matrix hydrophilic by irradiating the blocking layers with ultraviolet rays.

11. The method of claim 10, wherein each blocking layer has a different refractivity such that ultraviolet rays having penetrated the blocking layers irradiate the side surface of the black matrix.

12. The method of claim 11, wherein the plurality of blocking layers has a lowermost blocking layer attached to the black matrix, and wherein the lowermost blocking layer is closely attached to the upper surface of the black matrix such that the upper surface of the black matrix does not contact air.

13. A method of fabricating a black matrix of a color filter, the method comprising:

forming a black matrix layer on an upper surface of a transparent substrate, the black matrix layer being formed of a hydrophobic organic material;

forming a black matrix by patterning the black matrix layer;

attaching a blocking layer to an upper surface of the black matrix; and making the side surfaces of the black matrix hydrophilic by exposing the side surfaces of the black matrix to a plasma.

14. The method of claim 13, further comprising attaching at least one pressure layer to an upper surface of the blocking layer after attaching the blocking layer, such that the pressure layer applies pressure to the blocking layer to closely hold the blocking layer to the upper surface of the black matrix.

15. The method of claim 14, wherein the inside of the pressure layer is filled with fluid.

16. The method of claim 13, wherein the plasma is oxygen ($O_2$) plasma.

17. The method of claim 13, wherein the blocking layer has a shape corresponding to that of the black matrix.

18. A black matrix prepared by:

forming a black matrix layer on an upper surface of a transparent substrate, the black matrix layer being formed of a hydrophobic organic material;

forming a black matrix by patterning the black matrix layer; and making the side surfaces of the black matrix hydrophilic by irradiating the side surfaces with ultraviolet rays while heating the black matrix, or by exposing the side surfaces of the black matrix to a plasma, wherein the black matrix has a side surface contact angle with an ink of less than or equal to 15°.

19. A display device comprising the black matrix of claim 18.

20. The display device of claim 19, wherein the display device is a liquid crystal display or an organic electroluminescent device.

* * * * *